(12) United States Patent  
Black

(10) Patent No.: US 8,473,304 B2
(45) Date of Patent: Jun. 25, 2013

(54) SYSTEMS AND METHODS FOR PROVIDING AND OBTAINING VALIDATED CUSTOMER FEEDBACK INFORMATION

(75) Inventor: Jonathan K. Black, Alpine, UT (US)

(73) Assignee: Iverification Services, LLC, Alpine, UT (US)

( * ) Notice: Subject to any disclaimer, the term of this patent is extended or adjusted under 35 U.S.C. 154(b) by 481 days.

(21) Appl. No.: 12/719,705

(22) Filed: Mar. 8, 2010

(65) Prior Publication Data

US 2011/0218930 A1 Sep. 8, 2011

(51) Int. Cl.
 *G06Q 30/02* (2012.01)
 *G06Q 10/10* (2012.01)
 *G06Q 10/06* (2012.01)
 *G06Q 30/06* (2012.01)
 *G06Q 10/08* (2012.01)

(52) U.S. Cl.
 USPC .......................................... 705/1.1; 705/346

(58) Field of Classification Search
 None
 See application file for complete search history.

(56) References Cited

U.S. PATENT DOCUMENTS

2009/0125320 A1* 5/2009 Bickett .............................. 705/1
2009/0249186 A1* 10/2009 Fetzer ........................... 715/234

* cited by examiner

*Primary Examiner* — Jonathan Ouellette
(74) *Attorney, Agent, or Firm* — Kirton McConkie; Evan R. Witt

(57) ABSTRACT

Systems and methods for providing validated customer feedback information about a service provider. Generally, the method includes providing a customer with a digital ratings device, such as digital pen, that is capable of receiving feedback information from the customer and uploading the information to a third-party provider. As the customer uses the digital ratings device to provide the information, the device may associate the information with temporal data, such as the time, date, and location at which the customer provided the information. In some cases, the temporal data is checked to ensure that the customer is actually one of the provider's customers. Because the information is validated as coming from a verified customer, the information is often more reliable than it would be if it were submitted anonymously. Thus, the validated information may present a substantially fair representation of the provider and be useful to potential customers.

20 Claims, 3 Drawing Sheets

SYSTEMS AND METHODS FOR PROVIDING AND OBTAINING VALIDATED CUSTOMER FEEDBACK INFORMATION

FIELD OF THE INVENTION

The present invention relates in general to systems and methods for providing and obtaining customer feedback about a service provider. More particularly, the present invention provides systems and methods for providing validated customer feedback information about the service provider through the use of a digital ratings device that collects survey data, rating data, and other customer feedback information from a customer. In some cases, the digital ratings device also associates the customer feedback information with temporal data (such as the time, date, and location at which the customer provides the customer feedback information). In such cases, a third-party validator validates the customer feedback information by checking the temporal data to ensure the customer is a verified customer of the service provider.

BACKGROUND OF THE INVENTION

As customers search for a service provider, they often look in the phonebook, ask friends or relatives for recommendations, or otherwise try to research which service provider can best meet their specific needs and desires. One popular method for searching for and researching service providers involves searching the Internet for a list of service providers and looking for comments, ratings, reviews, or other information that describes the experience and the quality of the services that customers typically receive from particular service providers.

While web pages that provide rating and survey information about service providers obtain their information in a variety of manners, many such web pages simply allow people visiting the pages to rate and provide comments or reviews about a particular provider.

While conventional systems and methods for providing rating and survey information on the Internet maybe somewhat useful to potential customers who are researching service providers, such methods and techniques are not without their shortcomings. In one example, people who are happy with a particular service provider typically have little to no incentive to post a positive review of their provider. In contrast, people who are upset with a provider are often motivated to post a negative review of that provider as a way to hurt or otherwise express their dissatisfaction with that particular provider. As a result, certain ratings/survey websites tend to provide an overall review of a service provider that is biased by one or more people who are not necessarily representative of the provider's customer pool as a whole. In another example, certain websites that provide rating/survey information about service providers allow practically anyone who accesses the webpage to post an anonymous review. As a result, such web pages often do not and cannot ensure that the people posting reviews are or have recently been customers of the service provider's services. For instance, some web pages allow competitors, enemies, and others who want to damage a service provider's reputation and practice to pose as a customer and post fraudulent reviews about the provider. Additionally, because some websites allow reviews to be posted anonymously, some people feel no accountability for their actions and go overboard in writing positive or negative reviews about a particular service provider.

In another example, some web pages that provide rating/survey information about service providers allow those posting comments to post more than one review about a particular service provider. Consequently, such web pages allow people to skew the overall rating/survey information in a manner that unduly harms or benefits particular service providers.

In light of the aforementioned shortcomings, some service providers have become so worried that the information provided on online ratings/survey websites is biased that the providers have had their customers sign a gag agreement, or an agreement in which the customers agree not to post any form of a review about the provider on the Internet.

In short, some websites that provide ratings/survey information about service providers end up giving an unfair representation of certain service providers. Similarly, where the information provided on such web pages is skewed, fraudulent, extreme, or otherwise inaccurately represents the feelings of the provider's actual customers as a whole, the value of such information to potential customers is diminished.

Moreover, because certain websites are more likely to receive negative reviews of a service provider than they are likely to receive positive reviews, such websites tend to contain relatively large amounts of content relating to service providers who are generally considered as providing substandard services. At the same time, because such websites tend to receive or produce relatively few positive reviews, such websites tend to have a relatively small amount of content that relates to service providers who would generally be considered as providing above-standard services. Because certain search engines rank websites by the amount of content that the websites have relating to a particular service provider, the websites described above tend to bury some excellent service providers in the search engine results, while bringing substandard service providers to the top of the search results. In other words, certain conventional websites can actually promote substandard service providers while making it harder for Internet users to find information about some excellent service providers.

Thus, while techniques currently exist that are used to provide rating/survey information about service providers, challenges still exist, including challenges that diminish the overall fairness of particular ratings systems to certain service providers and the overall usefulness of the rating/survey information provided to potential customers. Accordingly, it would be an improvement in the art to augment or even replace current techniques with other techniques.

BRIEF SUMMARY OF THE INVENTION

The present invention provides systems and methods for providing and obtaining validated customer feedback information about one or more service providers. Generally, the described systems and methods include providing a customer with a digital ratings device, such as a digital pen, that is capable of receiving initial feedback information from the customer and uploading the initial information to a third-party provider. As the customer uses the digital ratings device to provide the initial information, the device may associate the initial information with temporal data, such as the time, date, and location at which the customer provided the initial information. In some cases, the third-party validator checks the temporal data to ensure that the initial information actually comes from a customer that is verified as being a customer of the provider. Because the initial information is validated as coming from a verified customer, the final validated information is often more reliable than similar information that is submitted anonymously. Thus, the validated information may present a substantially fair representation of the service provider and be useful to potential customers.

While the described systems and methods have proven particularly useful for providing validated customer feedback information for healthcare providers (including without limitation, doctors, hospitals, nurses, clinics, physicians' assistants, dentists, pharmacists, home healthcare providers, and the like), the skilled artisan will recognize that the described systems and methods may be used to provide validated customer feedback information for virtually any person, entity, organization, or group that provides services to customers. For example, instead of being limited to healthcare providers, the described systems and methods can be used for restaurants, hotels, repair shops, hospitality services, assisted living centers, merchandise dealers, retail stores, or any other person or persons who provide a service to a customer.

These features and advantages of the present invention will become more fully apparent from the following description and appended claims, or may be learned by the practice of the invention as set forth hereinafter.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings depict only typical embodiments of the invention and are not therefore to be considered to be limiting of its scope, the invention will be described and explained with additional specificity and detail through the use of the accompanying drawings in which:

DETAILED DESCRIPTION OF THE INVENTION

Figure 1:
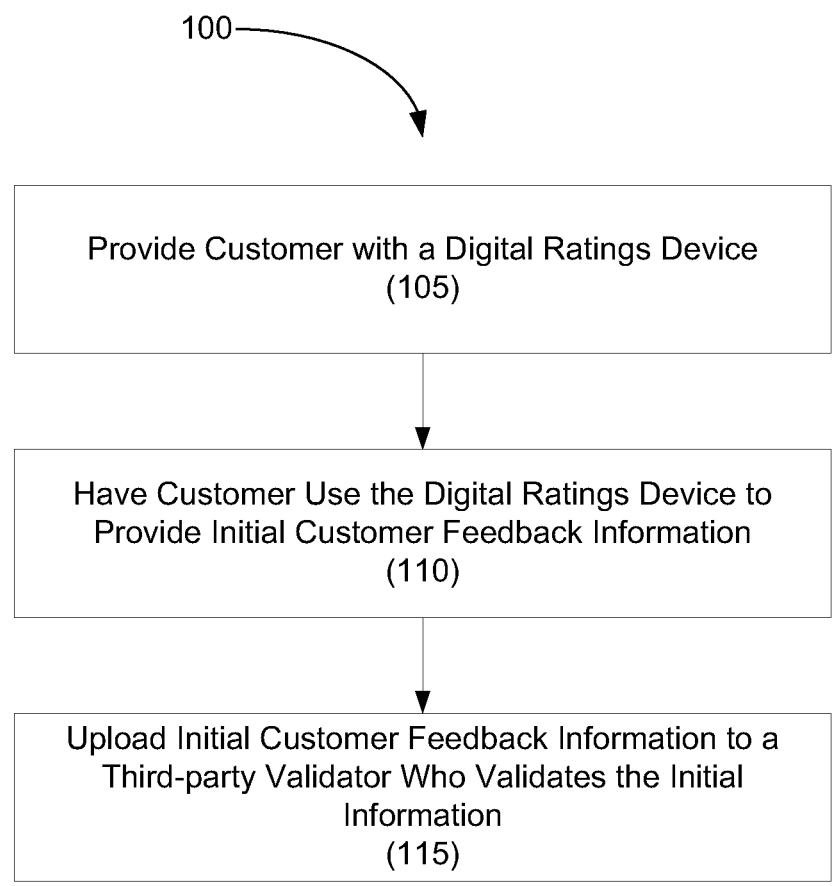
FIG. 1 illustrates a flow chart depicting a representative embodiment of a method used by a service provider to obtain validated customer feedback information.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of suitable digital ratings devices, validation techniques, temporal data, provider data, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, methods, or operations are not shown or described in detail to avoid obscuring aspects of the invention.

The present invention provides systems and methods for providing validated customer feedback information (also referred to herein as "validated information") about a service provider. Generally, the described systems and methods involve allowing a customer to provide initial customer feedback information (also referred to herein as "initial information") about a service provider and then checking to ensure that the initial information was provided by a verified customer, or by a person who has been shown to be an actual customer of the service provider. By identifying initial information as coming from a verified customer, the described systems and methods can designate the initial information as being validated information.

The described methods can be accomplished by any suitable type or number of actors. In some embodiments, however, the described methods are accomplished by one or more customers, service providers, and third-party validators. In such embodiments, a customer may comprise virtually any suitable person who is able to provide initial customer feedback information regarding a service provider. Some non-limiting examples of suitable customers include one or more patients, people who pay to receive a service from a service provider, people who pay to receive a product from a service provider, and any other suitable person who receives or attempts to receive a service or a product from a service provider.

As used herein, the term service provider may refer to any suitable person, group, entity, organization, etc. that provides a service or a product to a customer. In some embodiments, however, the described methods are used to provide validated information about healthcare services providers. Some examples of suitable healthcare service providers include, but are not limited to, doctors, nurses, nurse practitioners, dentists, pharmacists, pharmacies, hospitals, clinics, chiropractors, nutritionists, home-healthcare assistants, and any other person or group of people (such as staff, employees, representatives, agents, etc.) that provide healthcare services or that work on behalf of someone who provides healthcare services.

As used herein, the term third-party validator may refer to any suitable person, group, entity, software, device, or other actor that is capable of checking to determine whether initial information regarding a particular service provider was given by a verified customer of that particular provider. In one non-limiting embodiment, the third-party validator comprises software, such as a web-based or a client-based software application, which is capable of validating whether the initial information was provided by a verified customer. In another non-limiting embodiment, the validator comprises one or more individuals (such as a third party) who checks a customer's initial information to validate that information. In still another non-limiting embodiment, the validator comprises a software application and one or more individuals that are capable of validating the customer's initial information.

The described methods can be accomplished in any suitable manner that allows the third-party validator to validate a customer's initial information as coming from a verified customer. To provide a better understanding of the described methods, several embodiments of suitable methods are described below in more detail. Specifically, the following discussion first provides a detailed description of a non-limiting embodiment of a method that a service provider can follow to obtain validated customer feedback information. Following this discussion, a detailed description is provided of a non-limiting embodiment of a method that a third-party validator can follow to provide validated information about a service provider. It should be noted that each of these methods can be modified in any suitable manner. For instance, any suitable step can be added to, be removed from, or be reordered within each of the methods. It should also be noted, that while the term step is used in the following methods, the term is simply used to draw attention to different portions of the described methods and is not meant to delineate a starting point or a stopping point for any portion of the methods, or to be limiting in any other way.

As previously mentioned, FIG. 1 illustrates a non-limiting embodiment of a method 100 for obtaining validated information through actions performed by a service provider. In particular, FIG. 1 shows the method 100 begins at step 105 where the service provider provides a customer with a digital ratings device. While this step can be accomplished at any suitable time, in some embodiments, this step occurs shortly after the customer receives services from the service provider. Indeed, in one non-limiting example, a member of a doctor's staff provides the digital ratings device to the customer after the customer has been seen by the doctor but before the customer leaves the doctor's office. Thus, in the previous example, the service provider provides the digital ratings device to the customer at a time and location that is designated by the service provider.

The digital ratings device can comprise any suitable electronic device that is able to record initial customer feedback information, to record temporal data, and to transfer the initial information and the temporal data (both of which are described hereinafter) to a third-party validator. Some non-limiting examples of a suitable digital ratings device include a known or novel: digital pen; touch screen device; personal digital assistant; laptop computer; tablet computer, hand-held computer, and/or any other electronic device or system (such as a docking system, a computer, a modem, a cellular telephone, etc.) that helps the digital ratings device record initial information from the customer, associate the initial information with temporal data, and/or digitally transmit the initial information and the temporal data to the third-party validator.

Indeed, in some non-limiting embodiments, the digital ratings device comprises a conventional digital pen. In such embodiments, the digital pen may comprise any suitable component or characteristic that allows it to function as the digital ratings device. In one non-limiting example, the pen comprises ink that allows the customer to see information as it is written. In another non-limiting example, the digital pen comprises a mechanism for recording initial information and uploading that information to the third-party validator. In this example, the mechanism or mechanisms for recording and then transmitting initial information to the validator, may comprise any suitable characteristic, including, but not limited to, a small camera or sensor that takes images of a pattern the camera sees as the pen writes, a memory component, and a communications device or port that allows the pen to upload its pictures to the third-party validator.

In some non-limiting embodiments in which the digital rankings device comprises digital pen, the pen is also used with a service rating form that has a unique digital pattern in the form's background. In such embodiments, the form can comprise any suitable questionnaire, survey sheet, ratings sheet, and/or other form that has a unique digital pattern in its background, wherein the unique digital pattern is digitally-recognizable by the digital pen. Moreover, in some embodiments in which the digital ratings device comprises a digital pen and a service ratings form, the camera in the pen takes pictures of the unique digital pattern it sees on the form as the pen is moved across the form. In this manner, the pen can record the initial information by constantly recording the absolute position of the pen on the form. Accordingly, after the customer uses the pen and form to provide initial information, the customer can take the form and leave the pen with the service provider.

Returning to FIG. 1, step 110 shows that after the customer has the digital ratings device, the method 100 continues as the service provider instructs the customer to use the digital ratings device to provide initial customer feedback information about the service provider. As used herein, the term initial customer feedback information, and variations thereof, may refer to any suitable information that the customer can relay to the third-party validator through the digital ratings device. Non-limiting examples of suitable initial customer feedback information include ratings related to: the service provider, services rendered by the provider, or any other suitable information related to ratings; survey and questionnaire responses; customer comments; reviews; and any other suitable information the customer can provide with the digital ratings device.

While not illustrated in FIG. 1, in some embodiments, the digital ratings device associates temporal data with the initial information provided by each customer. In such embodiments, the temporal data can comprise any data that allows the third-party validator to identify the customer as being a verified customer of the service provider. Some examples of suitable temporal data include, but are not limited to: the time, date, and/or location at which the customer provided the initial information with the digital ratings device; a unique digital identifier of the digital ratings device; a unique digital pattern on the service ratings form, as recorded by the digital ratings device; an internet protocol ("IP") address of the computer or electronic device that uploads the initial information; the global positioning system ("GPS") coordinates of the digital recordings device (which may include a mechanism that relays information from the digital ratings device to the third-party validator); the caller ID information from a telephone that transmits initial information from the digital ratings device to the third-party validator; a central processing unit identification ("CPU ID") from a computer that relays information from the ratings device to the validator; or any other suitable information that can be used to identify the customer as being a verified customer of the service provider.

Where the digital ratings device associates temporal data with a customer's initial information, the temporal data can be collected and/or associated with the initial information at any suitable time. In one non-limiting example, the digital ratings device collects temporal data as a customer uses the device to input initial information. For instance, temporal data can be collected with each stroke of a digital pen to indicate the time at which the stroke occurred. In another non-limiting example, temporal data is collected after a customer provides initial customer feedback information. For instance, temporal data (such as an IP address of a computer sending the initial information) can be collected when the initial information is sent to the third-party validator. In still another non-limiting example, temporal data, such as the digital ratings device's unique digital identifier is collected before the customer provides the initial information and is then transmitted after the information is provided.

Returning to FIG. 1, that figure shows the illustrated method 100 shows that after the customer has provided initial customer feedback information, the service provider (including those who work on the provider's behalf) uploads the initial information and the temporal data to the third-party validator so that the validator can check the temporal data and ensure that the initial information was provided by a verified customer.

The initial information and temporal data can be uploaded to the third-party validator in any suitable manner. In one non-limiting example, the digital ratings device is wirelessly connected to a telephone or modem through a BLUETOOTH® or a WI-FI® connection. In this example, during or after the time in which the customer provides initial customer feedback information, the telephone or modem uploads the initial information and temporal data to the third-party validator. In another non-limiting example, the digital ratings device stores the initial information until the device is placed in a docking station. In this example, when the digital ratings device is docked, the initial information and the temporal data are sent (e.g., via a network) to the third-party validator. Thus, in this example, the digital ratings device can collect initial information from a plurality of customers before the device is docked and the initial information is transmitted to the validator.

The method 100 in FIG. 1 can be repeated for any suitable number of customers that visit the service provider in a specified period of time. Accordingly, the described methods can be used to obtain initial information from practically any customer that visits the service provider and is willing to provide initial customer feedback information during the visit. As a result, the described methods can help provide validated information from a group of the provider's customers that is more representative of the provider's customers as a whole than is typically the case in certain online rating/survey web sites that tend to reflect the opinions of a relatively small number of angry customers.

Figure 2:
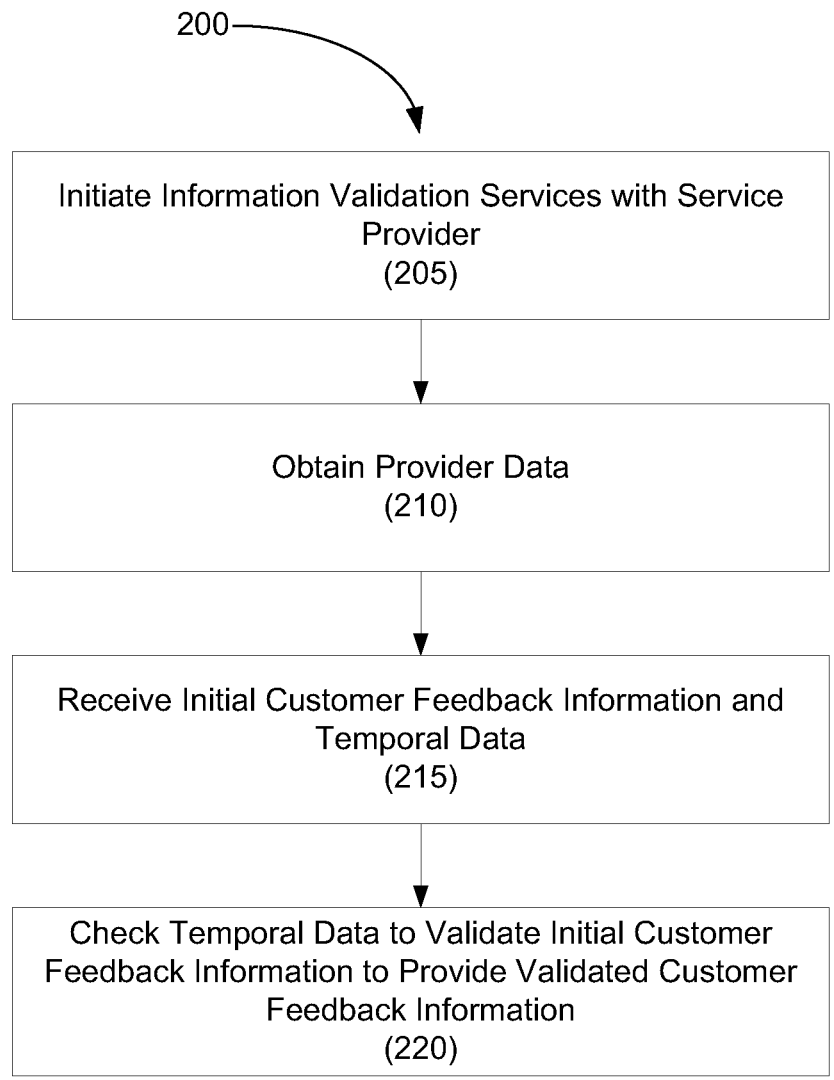
FIG. 2 illustrates a flow chart depicting a representative embodiment of a method used by a third-party validator to provide the validated customer feedback information.

Moving on to FIG. 2, that figure illustrates a non-limiting embodiment of a method 200 that a third-party validator follows to provide validated information about a service provider. Specifically, FIG. 2 shows that this particular embodiment of the method 200 begins at step 205 as the third-party validator initiates its information validation services with one or more service providers. In this step, the third-party validator can initiate its services with a service provider in any suitable manner, including without limitation, by providing the service provider with one or more digital ratings devices, by activating one or more digital ratings devices so that the devices are capable of transmitting initial information to the validator, by installing software for the digital ratings device on the provider's computers, by providing the service provider with a username and password, and/or by otherwise making it possible for the service provider to obtain initial information from a customer through a digital ratings device and then to send that initial information to the third-party validator.

Next, at step 210, FIG. 2 shows the method 200 continues as the third-party validator gathers information about the provider ("provider data"). This provider data can comprise any suitable information that identifies the provider or otherwise allows the third-party validator to compare the temporal data collected with the provider data to determine whether the initial information was provided by a verified customer, or a customer who actually visited the provider at the time of the submission of the initial information. Some non-limiting examples of suitable provider data include the location (e.g., address, GPS coordinates, etc.) at which the service provider states that customers will provide initial customer feedback information, the unique digital identifier of any digital ratings devices the service provider uses to obtain initial information, the unique digital pattern contained in service ratings forms used by the service provider, the IP address of the computer or electronic device that the provider uses to upload initial information, the caller ID information from the telephone that transmits initial information from the digital ratings device to the third-party validator, the CPU ID of the computer that relays initial information from the ratings device to the validator, an estimate of a reasonable number of customers that will visit the service provider in any suitable specified period of time (e.g., one day), the actual number of customers that have visited the service provider in a given period of time, the service provider's business hours, the business provider's work schedule (e.g., days off, days out of the office, etc.), the minimum amount of time reasonably needed between submissions of initial information, profile data, and/or any other suitable information that can be compared with the temporal data to identify the customer as being a verified customer of the service provider.

While FIG. 2 shows the third-party validator collects the provider data before receiving initial information, the provider data can be supplied to the validator at any suitable time in the process. Indeed, in one non-limiting example, the provider data is provided during or after the initial data is collected. For instance, when the digital ratings device transmits the initial information collected from a plurality of customers during a day, the provider may also transmit the actual number of customers that visited the provider that day.

Returning to FIG. 2, that figure shows the method 200 continues at step 215 as the third-party validator receives initial customer feedback information that was provided by the service provider's customers. In this step, the initial information may be received in any suitable manner. In one non-limiting example, the initial information is uploaded to a server, a database, an e-mail address, or a website that is controlled by the third-party validator. In some preferred embodiments, the initial information is uploaded to a server to which the validator has access.

Next, at step 220, FIG. 2 shows the method 200 continues as the third-party validator validates the initial information. In this step, the third-party validator can validate the initial information in any suitable manner. In some non-limiting embodiments, the third-party validator validates the initial information by comparing the temporal data associated with the initial information with the provider data collected from the service provider to ensure that the information was provided by a verified customer of the provider. In such embodiments, the third-party validator can make any suitable comparison that allows the validator to validate or invalidate the initial information. Indeed, in one non-limiting example in which the temporal data comprises the location of the service provider's office, the third-party validator checks to see that the location information sent with the initial information matches the location information gathered in the provider data. In another non-limiting example, where the temporal data comprises a unique digital identifier of a digital ratings device, a unique pattern of a service ratings form, an IP address, caller ID information, a CPU ID, and/or some other similar data, the third-party validator compares that temporal data with corresponding data in the provider data to determine whether the initial information was provided by a verified customer.

In other non-limiting embodiments, the third-party validator validates the initial information by checking for one or more indicators that the initial information is potentially fraudulent. In such embodiments, the indicators that initial information is potential fraudulent can include any indication that: initial information was not provided by a verified customer, that a customer submitted more initial information than requested (e.g., that a customer filled out more than one service ratings form), that a customer misused the digital ratings device, and/or any other suitable indicator that the initial information was not correct and/or was not provided in good faith. In one non-limiting example, an indication that the initial customer feedback is potentially fraudulent is that the initial information is provided by the customer outside of the service provider's business hours. Another non-limiting example of a suitable indicator of potential fraud includes an indication that the initial information was provided at a faster rate than deemed reasonable provider data. For instance, if the provider data indicates that the minimum time needed to complete a service ratings form is 10 minutes and the temporal data associated with the initial information indicates that 4 service ratings forms were completed with the same digital ratings device in 10 minutes, then the third-party validator can invalidate any or all of the ratings forms completed in that 10 minute period. Still another non-limiting example of a suitable indicator that the initial information is potentially fraudulent includes an indication that more customers provided initial information than reasonably expected in a set period of time. For instance, if the provider data states that 20 customers visited the provider on a certain day and 25 service ratings forms were created on that day, the third-party validator may invalidate any or all of those service ratings forms.

In still other non-limiting embodiments, the initial information is validated by removing content from the initial information that meets one or more content-disqualification criteria. Some non-limiting examples of content-disqualification criteria include offensive language (such as swear words, epithets, etc.), non-professional comments (such as personal attacks that are not related to the services provided), improper use of the service ratings form, improper data accuracy, and/or other content that does not provide feedback that is valuable to potential customers of that service provider. While the validation process in such embodiments can involve screening for content-disqualification criteria with a software application, in other embodiments, the described method 200 involves manually screening for content-disqualification criteria manually. In still other embodiments, however, the method involves manually and electronically screening for content-disqualification criteria. For instance, where a software application is used to screen for standardized content-disqualification criteria (e.g., where multiple bubbles are filled in on a single question), manual screening may be used to find content-disqualification criteria that are included in the customer's written statements.

As in the method 100 illustrated in FIG. 1, the method 200 in FIG. 2 can be repeated any suitable number of times. Accordingly, the third-party can provide its information validation services to any suitable number of service providers, from any suitable field of service (including the healthcare profession).

Figure 3:
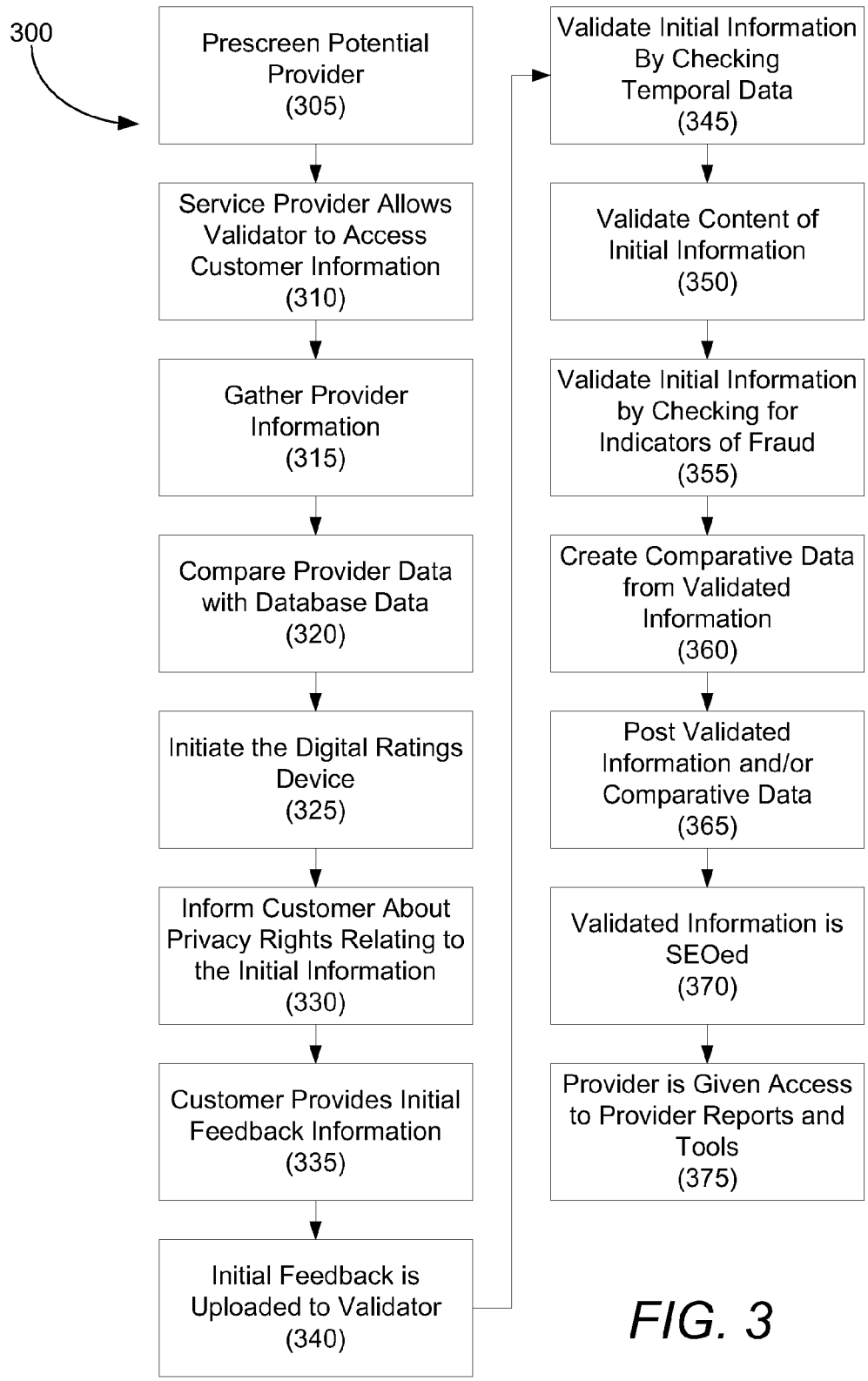
FIG. 3 illustrates a flow chart depicting a representative embodiment of a method for providing and obtaining the validated customer feedback information.

The systems and methods described herein may be modified in any suitable manner that allows them to function as intended. By way of non-limiting example, FIG. 3 illustrates a flowchart depicting one non-limiting embodiment of how the described methods may be modified from the methods 100 and 200 shown in FIGS. 1 and 2. Again, as in the methods 100 and 200 described above, the following method 300 can be modified in any suitable manner, including, but not limited, by adding, removing, and/or rearranging one or more steps in the method 300. Similarly, the following method 300 can be modified by changing the actor or actors who perform one or more steps in the method.

With respect to FIG. 3, that figure shows the method 300 begins at step 305 where the third-party validator (including someone working on the validator's behalf) or any other suitable party prescreens one or more service providers who could potentially participate in the third-party validator's information validation services. In this step, the third-party validator can prescreen the potential service provider for virtually any desired characteristic. Nevertheless, in some non-limiting embodiments, the validator prescreens the potential service provider for one or more provider-disqualification criteria. Some non-limiting examples of provider-disqualification criteria include indications that a provider: is or has been sanctioned (e.g., for substance abuse, unprofessional conduct, negligence, controlled substance violations, negligence, fraud, sexual misconduct, failure to maintain adequate records, etc.), has a history of receiving professional disciplinary action, is a defendant in a pending malpractice suit, has lost a malpractice suit, has a serious criminal record, is not licensed, and/or has any other indication that the service provider's service is substandard.

Where the third-party validator determines that a particular service provider meets one or more provider-disqualification criteria, the validator can take any suitable action, including, but not limited to, preventing that provider from participating in the validator's information validation services with a provider status. In such instances, the provider may be able to participate as a customer to provide initial customer feedback information for some other service provider while not being able to have its own customers provide initial information to the validator. In this manner, the third-party validator can ensure that it does not provide its information validation services to service providers that already have a bad reputation or substandard practices.

Returning to FIG. 3, step 310 shows that after the third-party validator finds that a potential service does not meet any provider-disqualification criteria, the service provider optionally agrees to provide the third-party validator with the ability to monitor, post, edit, modify, and/or otherwise use the initial information provided by that provider's customers. In some embodiments, the service provider also grants the third-party validator with the right to prevent the service provider from receiving additional information validation services and/or to remove or destroy previously validated information when that provider continually receives an average rating below a specified level.

Moving on to step 315, that step shows the illustrated method 300 continues as the third-party validator (or another suitable party) gathers provider data from or about the service provider. This step can be accomplished in any suitable manner, including without limitation, in the manner described above with respect to step 210 in FIG. 2.

Step 320 shows that the method 300 continues as the third-party validator (or another suitable party) compares the provider data received from the service provider with information regarding the provider that is provided through one or more provider databases. At this step, the third-party validator can update data in the databases to provide more current information about the service provider.

Continuing with the method 300, step 325 shows that any suitable party, such as the third-party validator, initiates the digital ratings device. In this step, the digital ratings device may be initiated in any suitable manner that allows the device to relay initial information from the service provider's customers to the third-party validator in a manner that allows the validator to validate the initial information. In one non-limiting example, the third-party validator assigns a unique digital identifier to one or more digital ratings devices and/or provides a unique digital pattern to the provider's service ratings forms. In this example, the third-party validator can match any suitable portion of the provider data with the unique digital identifier and/or the unique digital pattern. For instance, the third-party validator can link the unique digital identifier to the service providers' license number, office location, and/or any other suitable provider data that identifies the service provider. In another non-limiting example, the third-party validator initiates the digital ratings device by accessing one or more of the service provider's computers and installing software that is needed to operate the ratings device. In still another non-limiting example, the third-party validator tests the digital ratings device, obtains additional provider data (e.g., CPU ID, IP addresses, etc.), or otherwise prepares the ratings device to transmit initial information to the validator.

According to some embodiments, step 330 shows that before or as the customer provides the initial information, the customer is informed as to his or her privacy rights in the initial information. In such embodiments, the customer can be informed of his or her privacy rights in the initial information in any suitable manner. Indeed, in one non-limiting example, the customer is informed that any or all of the customer's initial information can be published (e.g., on the Internet).

In another non-limiting example, however, the customer is allowed to select a privacy level for the initial information. Where the customer is allowed to select a privacy level for the initial information, the customer can select any suitable privacy level. In one non-limiting example, the customer is able to select a privacy level that only allows the initial information (or a validated form thereof) to only be viewed by a select group of people. Some examples of suitable people include, but are not limited to, the service provider and/or the third-party validator. In another non-limiting example, however, the customer is able to select another privacy level that allows the initial information (or a validated form thereof) to be posted on the Internet so as to be accessible to virtually any Internet user.

Returning to FIG. 3, step 335 shows the service provider can instruct customers to use the digital ratings device to provide initial information regarding the service provider.

After the customer provides the initial information, step 340 shows the initial information is uploaded to the third-party validator. Then, with the initial information uploaded, steps 345, 350, and 355 show the third-party validator can validate the initial information. While this validation process can occur in any suitable manner, steps 345, 350, and 355 respectively show the information can be validated by comparing the temporal data with the provider data, by checking the initial information for one or more content-disqualification criteria, and/or by checking for one or more indicators of possible fraud; each of which are discussed above with respect to step 220 in FIG. 2.

After the initial information is validated as coming from a verified customer; as being free from content-disqualification criteria; being free from indicators of potential fraud; and/or is otherwise validated, step 360 shows that, in some non-limiting embodiments, the method 300 continues as the third-party validator compares the validated information from one service provider with the validated information collected from one or more other service providers. In this manner, the third-party validator is able to create comparative data between service providers in any suitable manner. In such embodiments, the third-party validator (or someone who receives the validated information from the third-party validator) can compare the validated information from multiple service providers in any suitable manner, including without limitation, by comparing service providers in the same or similar fields, by comparing service providers in a geographical location (e.g., zip code, city, state, country, etc.), and/or in any other suitable manner. This comparative data can then be used by potential customers to compare service providers and to make an informed decision as to which service provider will likely meet the potential customer's particular needs and desires.

Step 365 shows the method 300 can continue as the third-party validator (or another suitable party) posts the validated information (which may include comparative data). In this step, the validated information may be posted in any suitable manner. In one non-limiting example, the validated information is posted in an electronic format, including, but not limited to, being posted on the Internet, in one or more e-mail communications, and/or in any other suitable electronic form. In another non-limiting embodiment, the validated information is placed in a physical format, including, but not limited to, being placed in a magazine, a newspaper, a book, and/or in any other suitable physical form.

In some presently preferred embodiments, the validated information is posted on the Internet. In such embodiments, the validated information can be posted in any suitable manner. In one non-limiting example, the validated information is posted on a website controlled or otherwise designated by the third-party validator or any other suitable person or organization, such as an online ratings publisher. In another non-limiting example, the validated information is posted on a website that is controlled or otherwise selected by the service provider. In still another non-limiting example, the validated information is posted on a plurality of websites.

Where the validated information is posted on the Internet, step 370 shows the validated information is optionally search engine optimized ("SEOed") to help Web pages including the validated information to be given higher rankings in typical search engine search results.

Step 375 shows the method 300 continues as the third-party validator (or any other suitable party displaying the validated information) provides the service provider with access to service provider reports and tools. While the service provider can be allowed to access any suitable type of reports, some examples of suitable reports include, but are not limited to, ongoing reports showing initial information in near real-time, reports displaying comparative information in near real-time, reports showing specific search engine ratings for Web pages containing the validated information, reports of possible ways to mitigate risks, reports of possible ways to improve services, and/or any other suitable report. Similarly, some non-limiting examples of suitable tools include, search engine optimization tools, ranking tools, display tools, and any other suitable tool that allows a service provider to use or manipulate the initial or validated information.

As in the methods described above, the method 300 shown in FIG. 3 can be repeated any suitable number of times to allow one or more service providers to obtain, and to allow the third-party validator to provide, validated information about the service providers.

The described systems and methods may have several beneficial characteristics. In one non-limiting example, because the described systems and methods are capable of determining whether initial information was provided by verified customers of the service provider, the described systems and methods may prevent or reduce competitors' ability to post disparaging remarks about the service provider.

In another non-limiting example, because the described systems and methods can be used to screen for indications that a set of initial information is potentially fraudulent, the described systems and methods can make sure that each customer is only able to provide initial information about the service provider, once during a visit to that provider. Accordingly, unlike some conventional ratings methods that allow a single user to skew a service provider's ratings by posting multiple reviews of that service provider, the current methods work to provide a more complete picture of the service provider.

In still another non-limiting example, because the described systems and methods can easily be used by all or most of the customers that visit a service provider, the described systems and methods may provide a more fair representation of what the service provider's customers think of the provider and the provider's services than may certain conventional online ratings systems in which customers generally only post their feedback on the provider when they have an incentive (e.g., to hurt the service provider).

In still another non-limiting example, because the described systems and methods associate temporal data with a customer's initial information, the initial information can be validated as coming from a verified customer without disclosing that customer's identity.

In yet another non-limiting example, the described systems and methods allow customers to generate relatively large amounts of content related to a particular service provider. As this content is posted to the Internet, viewed by others, and SEOed, the search engine ratings for pages containing validated information relating to that service provider can be increased. As a result, the service providers with the highest rankings tend to be moved to the top of the search engine search results, while providers with lower rankings tend to be moved down in the search results.

In sum, the described systems and methods may provide validated information that depicts a fair representation of the service provider, as determined by the provider's verified customers. As a result, the described systems and methods can be more useful to the service provider as well as to potential customers than may some conventional Internet ratings systems.

While specific embodiments and examples of the present invention have been illustrated and described, numerous modifications come to mind without significantly departing from the spirit of the invention, and the scope of protection is only limited by the scope of the accompanying claims.

The invention claimed is:

1. A method for a first service provider to obtain validated customer feedback information about the first service provider, the method comprising:
  providing a customer with access to a digital ratings device that comprises a mechanism for digitally recording initial customer feedback information from the customer, generating temporal data, and uploading the initial customer feedback information to a third-party validator, wherein the temporal data comprises a location at which the initial customer feedback information is provided;
  providing the customer with an opportunity to use the digital ratings device to provide the initial customer feedback information, wherein the digital ratings device associates the temporal information with the initial customer feedback information; and
  uploading the initial customer feedback information to the third-party validator, wherein the third-party validator validates the initial customer feedback information to obtain the validated customer feedback information by checking the temporal data to ensure the initial customer feedback information was provided at premises of the first service provider and that the customer is a verified customer of the first service provider.

2. The method of claim 1, wherein the digital ratings device comprises a digital pen having a unique digital identifier.

3. The method of claim 1, further comprising providing the customer with a service rating form having a unique digital pattern that is recognizable by the digital ratings device and that identifies the service rating form with the first service provider.

4. The method of claim 1, wherein the third-party validator further validates the initial customer feedback information by checking the initial customer feedback information for an indicator that the initial customer feedback information is potentially fraudulent.

5. The method of claim 4, wherein the indicator is selected from an indication that the initial customer feedback information was provided outside business hours of the first service provider, an indication that the initial customer feedback information was provided at a faster rate than specified as being reasonable, and an indication that more customers provided the initial customer feedback information than specified as being reasonable in set period of time.

6. The method of claim 1, further comprising disqualifying a second service provider from participating in the method with a provider status when the third-party validator finds that the second service provider meets at least one provider-disqualification criterion.

7. The method of claim 1, further comprising uploading at least a portion of the validated customer feedback information to a first website designated by the first service provider as well as to a second website controlled by the third-party validator.

8. The method of claim 1, further comprising giving the customer an option to make at least a portion of the initial customer feedback information available to the public or to only a select group.

9. The method of claim 1, wherein the third-party validator further validates the initial customer feedback information by removing content that meets at least one content-disqualification criterion.

10. The method of claim 1, wherein the first service provider comprises a healthcare service provider.

11. A method for a third-party validator to provide validated customer feedback information about a first service provider, the method comprising:
  receiving initial customer feedback information regarding the first service provider, wherein the initial information was provided by a customer using a digital ratings device that records the initial information and associates the initial information with temporal data regarding the conditions under which the customer provides the initial information, wherein the temporal data comprises a location at which the initial customer feedback information was provided; and
  validating the initial information to provide the validated customer feedback information by checking the temporal data to ensure the initial customer feedback information was provided at premises of the first service provider and that the customer is a verified customer of the first service provider.

12. The method of claim 11, wherein validating the initial information further comprises checking the initial information for an indicator that the initial information is potentially fraudulent.

13. The method of claim 11, wherein the indicator is selected from an indication that the initial information was provided outside business hours of the first service provider, a sign that that the initial information was provided at a faster rate than specified as being reasonable, and a sign that more customers provided the initial information than specified as being reasonable in set period of time.

14. The method of claim 11, further comprising disqualifying a second service provider from participating in the method with a provider status when the second service provider meets at least one provider-disqualification criterion.

15. The method of claim 11, further comprising uploading the validated information to a first website designated by the first service provider as well as to a second website controlled by a third-party validator.

16. The method of claim 11, wherein the temporal data further comprises a time and a date at which the customer provides the initial information with the digital ratings device.

17. A method for a third-party validator to provide validated customer feedback information about a service provider, the method comprising:
   determining whether the service provider meets at least one provider-disqualification criterion that prevents the service provider from participating in the method with a provider status;
   obtaining provider data identifying the service provider, wherein the provider data includes a specific location designated by the first service provider;
   receiving rating data, survey data, or other initial customer feedback information regarding the service provider, wherein the initial information was provided by a customer using a digital ratings device that records the initial information and temporal data, which includes a time, a date, and a location at which the customer provided the initial information; and
   validating the initial information to provide the validated customer feedback information by comparing the initial information with the provider data to ensure the initial customer feedback information was provided at the specific location designated by the first service provider and that the customer is a verified customer of the service provider.

18. The method of claim 17, wherein method further includes checking the initial customer feedback information for an indicator that the initial customer feedback information is potentially fraudulent, and wherein the indicator is selected from an indication that the initial information was provided outside business hours of the service provider, an indication that that the initial information was provided at a faster rate than specified as being reasonable, and an indication that more customers provided the initial information than specified as being reasonable in set period of time.

19. The method of claim 17, wherein the initial information is provided on a service rating form comprising a unique digital pattern that is digitally recognizable to the digital ratings device.

20. The method of claim 17, wherein validating the initial information further comprise screening the initial information to remove content that meets at least one content-disqualification criterion.

* * * * *